United States Patent
Inoue

(10) Patent No.: US 9,525,786 B2
(45) Date of Patent: Dec. 20, 2016

(54) FACSIMILE MACHINE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Katsuhiro Inoue, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/260,354

(22) Filed: Apr. 24, 2014

(65) Prior Publication Data

US 2014/0340718 A1 Nov. 20, 2014

(30) Foreign Application Priority Data

May 15, 2013 (JP) .................................. 2013-103171

(51) Int. Cl.
*H04N 1/00* (2006.01)
*H04N 1/32* (2006.01)
*H04N 1/327* (2006.01)

(52) U.S. Cl.
CPC ...... *H04N 1/00217* (2013.01); *H04N 1/32096* (2013.01); *H04N 1/32767* (2013.01)

(58) Field of Classification Search
CPC ............ H04N 1/00217; H04N 1/00214; H04N 1/00209; H04N 1/32096; H04N 1/32736
USPC ................................. 358/1.15, 1.13, 405, 407
See application file for complete search history.

(56) References Cited

U.S. PATENT DOCUMENTS

| | | | | |
|---|---|---|---|---|
| 2005/0226264 A1* | 10/2005 | Toyoda | ............. | H04L 29/06027 370/431 |
| 2007/0091892 A1* | 4/2007 | Bouchard | ............... | H04L 63/10 370/392 |
| 2007/0268526 A1* | 11/2007 | Ito | ...................... | H04N 1/00214 358/403 |
| 2011/0043867 A1* | 2/2011 | Tonegawa | ...................... | 358/442 |
| 2011/0310890 A1* | 12/2011 | Yanagi | ............... | H04N 1/00212 370/352 |

FOREIGN PATENT DOCUMENTS

JP 2012-090220 A 5/2012

\* cited by examiner

*Primary Examiner* — Jamares Q Washington
(74) *Attorney, Agent, or Firm* — Rossi, Kimms & McDowell LLP

(57) ABSTRACT

A facsimile machine that is capable of executing a transmitting process corresponding to a user's request certainly. A setting unit receives a selection between a first connection method for connecting with a remote machine via a SIP server and a second connection method for connecting with a remote machine directly bypassing the SIP server. A communication unit communicates by the connection method selected by the setting unit when inputted destination information is a telephone number, and communicates using an IP address included in the destination information irrespective of the connection method selected by the setting unit when the inputted destination information is not a telephone number.

13 Claims, 5 Drawing Sheets

FIG. 4

| NAME | FACSIMILE NUMBER | IP ADDRESS |
|---|---|---|
| NETWORK FACSIMILE MACHINE A100 | 1111 | 192.168.1.11 |
| NETWORK FACSIMILE MACHINE B100 | 2222 | 192.168.1.12 | ns
FACSIMILE MACHINE, CONTROL METHOD THEREFOR, AND STORAGE MEDIUM STORING CONTROL PROGRAM THEREFOR

BACKGROUND OF THE INVENTION

Field of the Invention

The present invention relates to a real-time type network facsimile machine that executes facsimile communications based on the ITU-T recommendation T.38 and uses the SIP (Session Initiation Protocol) for call connection, a control method therefor, and a storage medium storing a control program therefor.

Description of the Related Art

Network facsimile machines that are equipped with the IPFAX communication function based on the SIP and the T.38 using an IP network are being spread in recent years. The SIP is a call control protocol for communicating multimedia, such as various sound, data, and images, on the IP network specified by the RFC 3261. The T.38 is one of recommendations of the ITU-T, and is a standard that specifies a method for translating a facsimile signal used in a subscriber telephone network into an IP message and for communicating. There are a method for connecting to a remote machine via a SIP server and a method for connecting a remote machine bypassing a SIP server, for an IPFAX communication in such a network facsimile machine. It should be noted that a SIP server associates a telephone number with an IP address using the SIP, and performs a call control for calling a remote machine and connecting with it.

One of the above-mentioned two methods is selected according to a setting of "Use of SIP server" registered in a machine. In a case where the setting of "Use of SIP server" is invalid, when an IP address is inputted as a destination, an IP message is transmitted to the destination specified by the IP address. Moreover, when a domain name is inputted as a destination, an IP address registered in a DNS server is obtained, and an IP message is transmitted to the destination specified by the IP address.

On the other hand, when the setting of "Use of SIP server" is valid, an IP message is transmitted to the destination specified by the IP address of the SIP server registered in the machine regardless of an inputted destination. When an address of destination is solved, the SIP server transmits an IP message to the solved IP address (for example, see Japanese Laid-Open Patent Publication (Kokai) No. 2012-90220 (JP 2012-90220A)).

When the above-mentioned conventional network facsimile machine performs an IPFAX communication via a SIP server, a SIP URI is inserted into a "To header" field of a SIP message, and "INVITE" is transmitted to the SIP server. The SIP URI is denoted by forms, such as "sip: 2222@192.168.1.11" and "sips:user@hoge.co.jp", for example. A character string located between "sip(sips):" and "@" is called a user part. An IP address, a host name, a domain name, or the like is described below "@". It should be noted that the user part is omissible.

When receiving this SIP message "INVITE", the SIP server specifies the IP address registered corresponding to "2222" that is the user part of the SIP URI, for example, and transmits the SIP message "INVITE" to the destination specified by this IP address. When a message is transmitted via a SIP server, it is necessary that the message "INVITE" includes a telephone number of a remote machine, an IP address, a user name, a domain name, etc. that are registered in the SIP server beforehand.

However, not all of a telephone number, an IP address, a user name, a domain name, etc. have been registered in a SIP server. For example, even if a user designates an IP address as a destination and transmits a message to a SIP server, the SIP server cannot connect with the remote machine because the SIP server cannot solve the address when the IP address is not registered in the SIP server.

SUMMARY OF THE INVENTION

The present invention provides a facsimile machine, a control method therefor, and a storage medium storing a control program therefor, which are capable of executing a transmitting process corresponding to a user's request certainly.

Accordingly, a first aspect of the present invention provides a facsimile machine comprising a setting unit configured to receive a selection between a first connection method for connecting with a remote machine via a SIP server and a second connection method for connecting with a remote machine directly bypassing the SIP server, and a communication unit configured to communicate by the connection method selected by the setting unit when inputted destination information is a telephone number, and to communicate using an IP address included in the destination information irrespective of the connection method selected by the setting unit when the inputted destination information is not a telephone number.

Accordingly, a second aspect of the present invention provides a control method for a facsimile machine comprising a setting step of receiving a selection between a first connection method for connecting with a remote machine via a SIP server and a second connection method for connecting with a remote machine directly bypassing the SIP server, and a communication step of communicating by the connection method selected in the setting step when inputted destination information is a telephone number, and to communicate using an IP address included in the destination information irrespective of the connection method selected in the setting step when the inputted destination information is not a telephone number.

Accordingly, a third aspect of the present invention provides a non-transitory computer-readable storage medium storing a control program causing a computer to execute the control method of the second aspect.

According to the present invention, the transmitting process corresponding to the user's request can be performed certainly.

Further features of the present invention will become apparent from the following description of exemplary embodiments with reference to the attached drawings.

BRIEF DESCRIPTION OF THE DRAWINGS

FIG. 4 is a view showing examples of facsimile numbers and IP addresses of facsimile machines.

DESCRIPTION OF THE EMBODIMENTS

Hereafter, embodiments according to the present invention will be described in detail with reference to the drawings.

Figure 1:
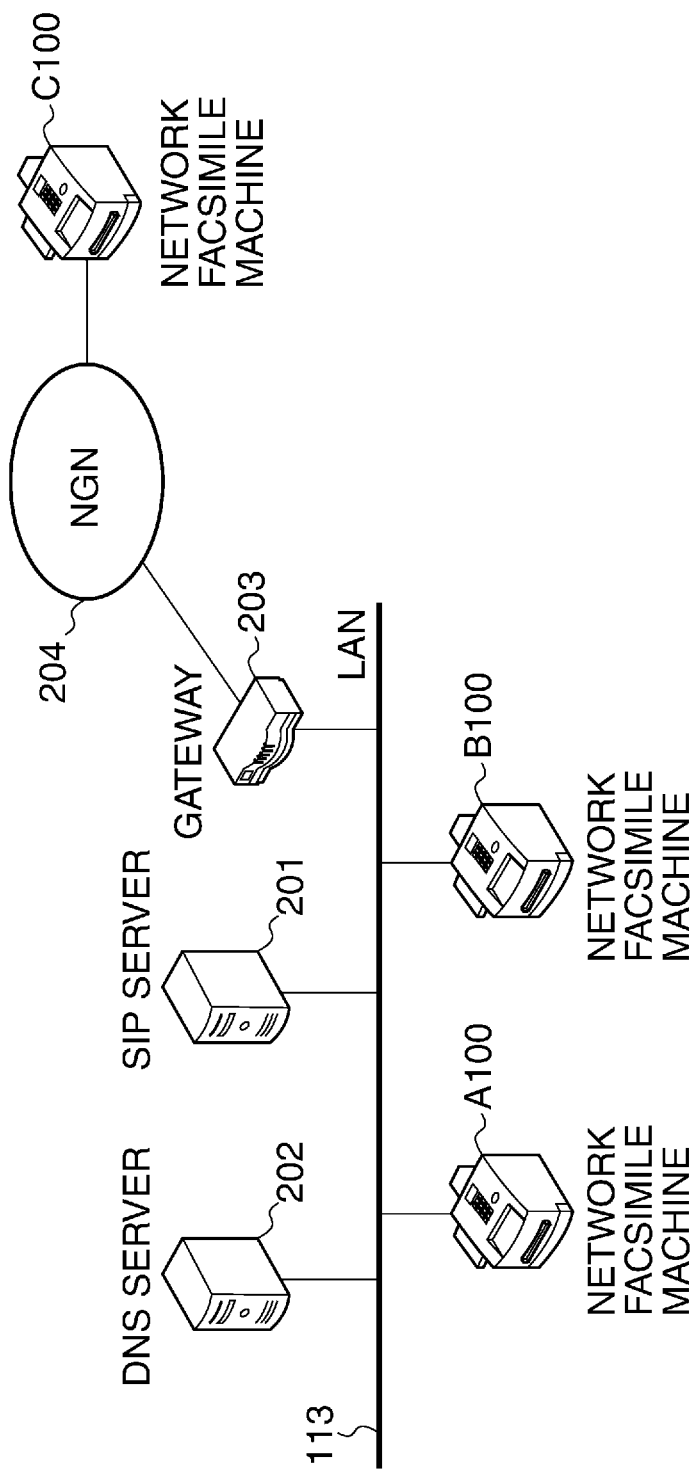
FIG. 1 is a view showing an example of a network system including facsimile machines according to an embodiment of the present invention.

FIG. 1 is a view showing an example of a network system including facsimile machines according to an embodiment of the present invention.

A facsimile machine A100 is a network facsimile machine that has an IPFAX-communication function based on the SIP and T.38, and that transmits and receives facsimile data with a facsimile machine B100 via a LAN 113.

Moreover, the facsimile machine A100 can transmit and receive facsimile data also with a facsimile machine C100 that is connected to a NGN 204 through a gateway 203. The NGN is a Next Generation Network that achieves a multimedia service in which a data communication service is united with a telephone service using an Internet Protocol technique.

A SIP server 201 performs the following operations in response to a request transmitted from the facsimile machines A100 and B100 through the LAN 113.

When the facsimile machines A100 and B100 communicate using the SIP server 201, terminal information, such as their own facsimile numbers, shall be beforehand registered in the SIP server 201.

The facsimile machine A100 transmits its own facsimile number to the SIP server 201 by a REGISTER message.

The SIP server 201 obtains the facsimile number of the terminal from the received REGISTER message, or obtains an IP address of the terminal of a transmitting source from an incoming packet. The SIP server 201 stores these pieces of data while associating to one another into a built-in hard disk (not shown). It should be noted that identification information of the terminal registered to the SIP server 201 shall be a telephone number that consists of numerals.

The facsimile machine A100 manages the term of validity of the terminal information registered in the SIP server 201, and updates the terminal information before expiring the term of validity by transmitting a REGISTER message to the SIP server 201 again.

A DNS server 202 associates and manages a host name (domain name) and an IP address, and converts a host name into an IP address. The gateway 203 executes various communication control processes, such as a communication protocol conversion process, in order to enable data transmission and reception between the LAN 113 and the NGN network 204.

Figure 2:
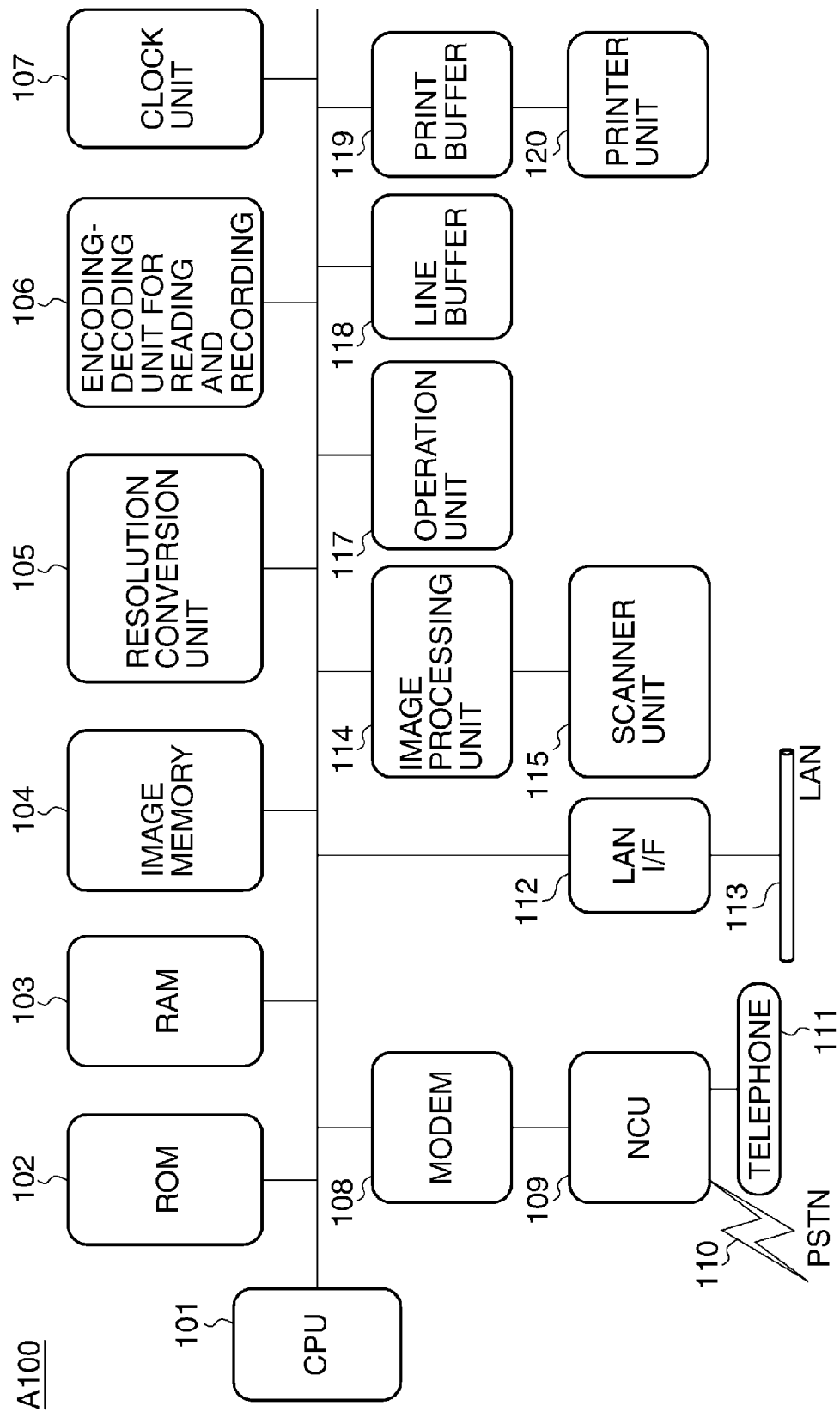
FIG. 2 is a block diagram schematically showing a hardware configuration of one of the facsimile machines shown in FIG. 1.

FIG. 2 is a block diagram schematically showing a hardware configuration of the facsimile machine A100 shown in FIG. 1. It should be noted that the facsimile machines B100 and C100 shall also have equivalent configurations.

A CPU 101 is a system control unit, and controls the entire machine. A ROM 102 stores a control program for the CPU 101. A RAM 103 is used as a work memory when the CPU 101 executes a program. An image memory 104 is configured with a DRAM (Dynamic Random Access Memory) etc., and stores image data.

A resolution conversion unit 105 controls a resolution conversion, such as a millimeter-inch resolution conversion for raster data. An encoding-decoding unit (codec) 106 for reading and recording executes an encoding-decoding process of the image data treated with the facsimile machine A100. A clock unit 107 consists of an IC etc. and measures an operation interval etc. A modem 108 demodulates a modulated signal from a line, and modulates and sends a signal from the machine to the line. A NCU 109 is an I/F unit with an analog line.

A PSTN 110 is an analog line. A telephone 111 is a hand set used for a call, an answering machine, or the like. A LAN I/F 112 is a network interface for controlling a network. A LAN (Local Area Network) 113 is an IP network.

An image processing unit 114 applies a compensation process to image data read by a scanner unit 115, and outputs high definition image data. The scanner unit 115 consists of a CMOS image sensor, an original-conveyance mechanism, etc., reads an original optically and converts it into electric image data. The scanner unit 115 can read a double-sided original, too.

An operation unit 117 consists of a keyboard, a display unit, etc., and allows an operator to perform various input operations. When the hand set (not shown) is in an off-hook state, the display unit displays that a dial operation is permitted. Moreover, when an external telephone (not shown) is in an off-hook state, the display unit displays that the machine is communicating and a communication reservation can be received.

A line buffer 118 is used when controlling transfer of image data. A print buffer 119 is a buffer memory of one page for storing character codes for print.

A printer unit 120 is a LPB (Laser Beam Printer) etc. that prints received image data and file data on a regular sheet and can perform double-side printing.

Figure 3:
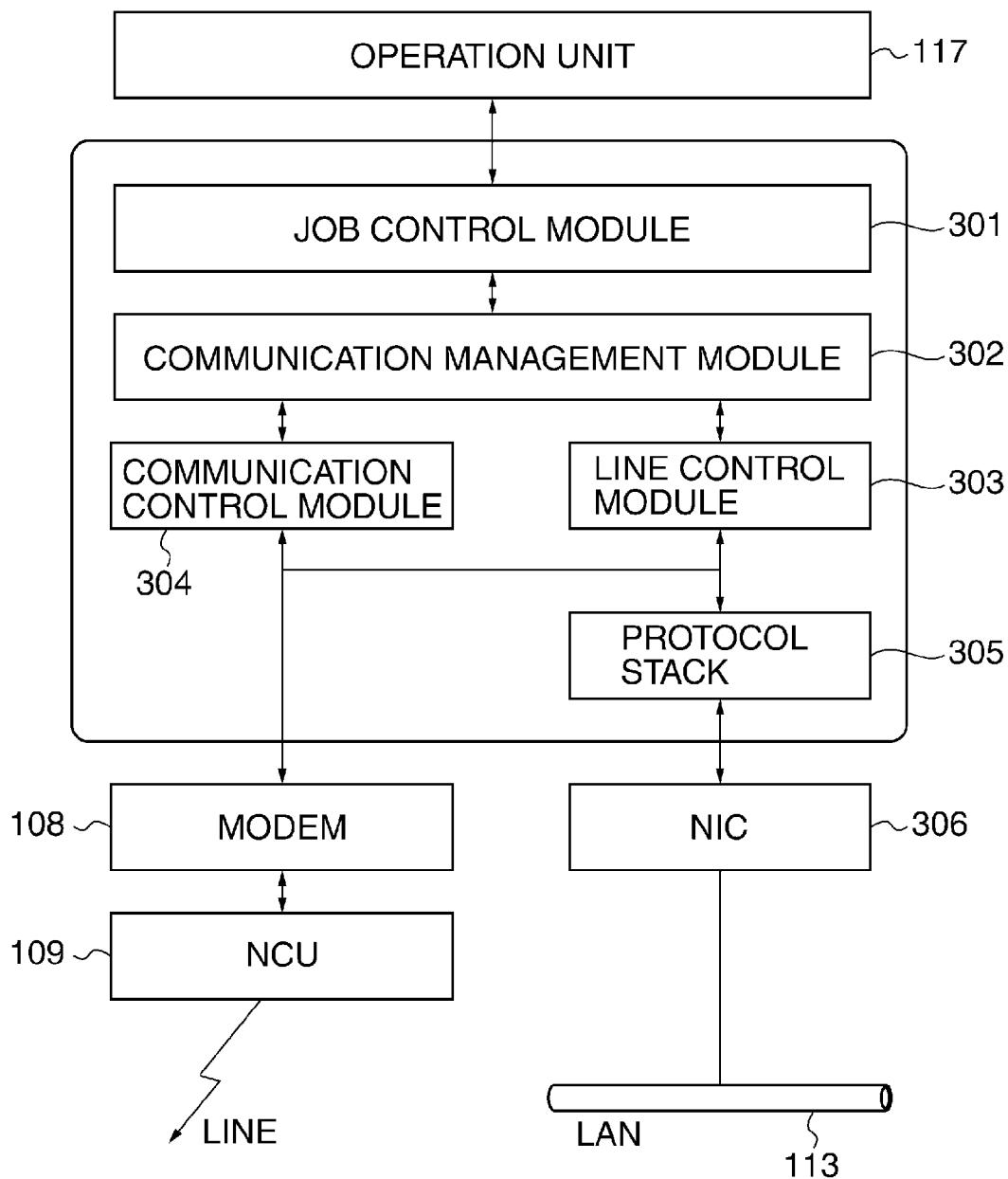
FIG. 3 is a block diagram schematically showing a software configuration of one of the facsimile machines shown in FIG. 1.

FIG. 3 is a block diagram schematically showing a software configuration of the facsimile machine A100. It should be noted that the facsimile machines B100 and C100 shall also have equivalent configurations.

When a facsimile-transmission operation is performed on the operation unit 117, a facsimile-transmission job is generated by a job control module 301, and a communication management module 302 is notified of the job.

The communication management module 302 requests a call process of a line control module 303 using the job information, such as destination information, that was notified from the job control unit 301. Since G3 facsimile transmission is performed when the line type defined in the destination information is the PSTN, the line control module 303 notifies the modem 108 and the NCU 109 to perform a dial operation. When the call is finished and the machine connects with the other side, the communication management module 302 starts the communication control module 304 to control the modem 108 and the NCU 109 under the T.30 protocol, and executes G3 facsimile communication.

Since IPFAX transmission using the SIP+T.38 protocol is performed when the line type defined in the destination information is the IP, the line control module 303 notifies a protocol stack 305 to connect with the other side through the SIP. The SIP message generated by the protocol stack 305 is transmitted to the LAN 113 through a NIC 306. When a session with the other side is established based on the SIP protocol, the communication control module 304 performs a real-time Internet facsimile procedure with the other side using the T.38.

FIG. 4 is a view showing examples of facsimile numbers and IP addresses of the facsimile machines A100 and B100.

The IP address of the SIP server 201 is stored in the RAM 103 of the facsimile machine A100. When a connection using the SIP server 201 will be established, a SIP URI of a destination is generated based on the facsimile number of the destination and the IP address of the SIP server 201. For example, when connecting with the facsimile machine B100, the SIP URI, which is put in a "To header" field of a SIP message, for the SIP server 201 is denoted by "sip: 2222@192.168.1.11".

When receiving "INVITE" of the above-mentioned SIP message, the SIP server 201 specifies the IP address stored corresponding to the facsimile number "2222" that is the front part of this SIP URI than "@". Then, this SIP message "INVITE" is transmitted to this IP address, i.e., to the facsimile machine B100.

The facsimile machine B100 replies "200 OK" in response to the SIP message "INVITE". Then, the facsimile machine A100 returns "ACK" in response to "200 OK".

As a result of the above-mentioned operations, the session for the facsimile communication is established between the facsimile machine A100 and the facsimile machine B100.

Figure 5:
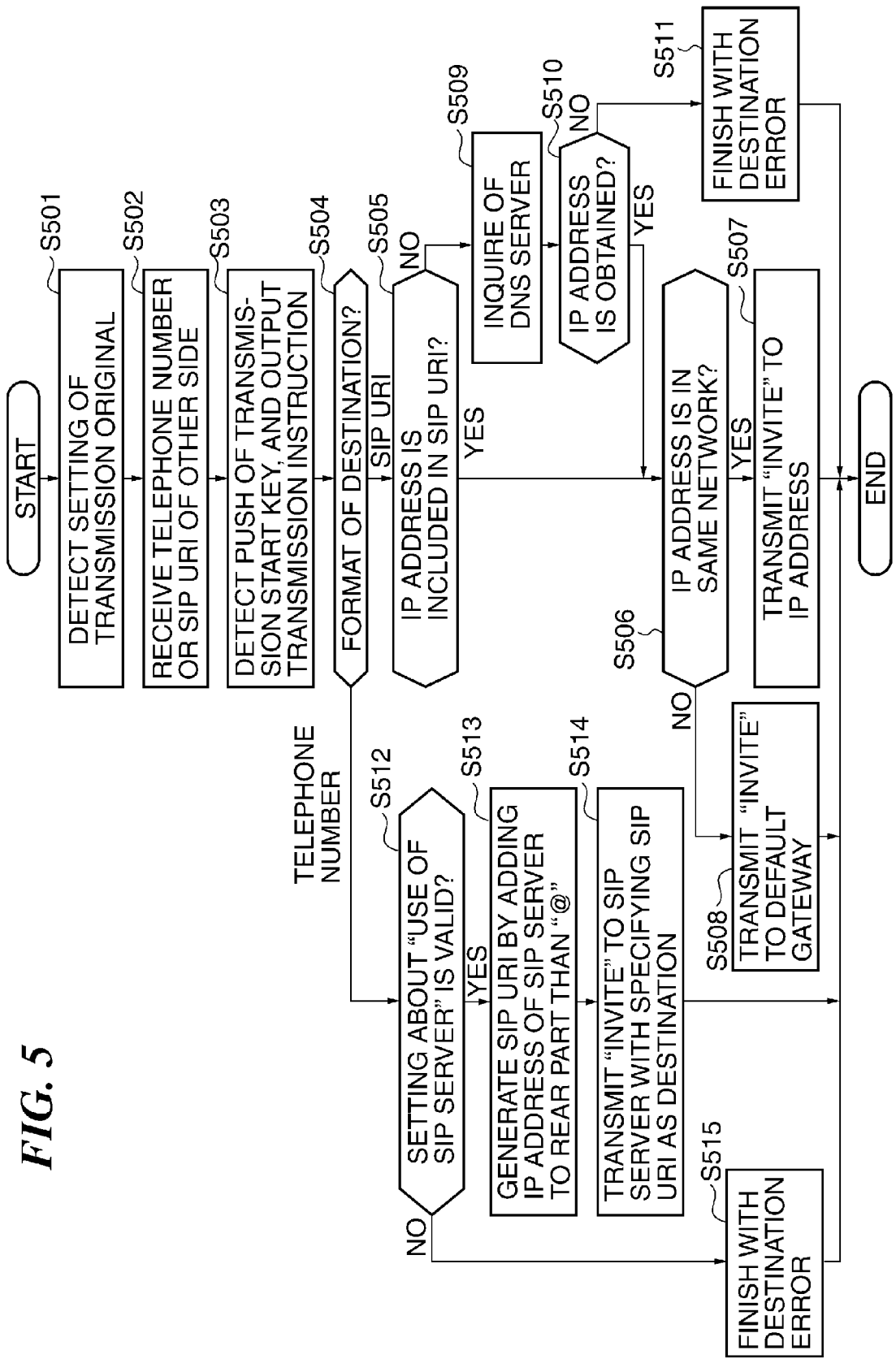
FIG. 5 is a flowchart showing a call control process executed in the facsimile machine.

FIG. 5 is a flowchart showing a call control process executed in the facsimile machine A100. This process is achieved when the CPU 101 executes a control program read from the ROM 102 under collaboration of the job control module 301 etc. shown in FIG. 3.

The CPU 101 of the facsimile machine A100 detects that a transmission original was set to the scanner unit 115 by a user (step S501). Next, the CPU 101 receives the destination information (a telephone number or a SIP URI of the other side) inputted by the user using a ten-key pad (not shown) etc. of the operation unit 117 (step S502). Here, the destination information may be inputted using an abbreviated dialing or may be inputted by selecting from a destination table.

Next, when detecting that the user pushed a transmission start button (not shown) of the operation unit 117, the operation unit 117 outputs a transmission instruction to the job control module 301 (step S503).

Next, the CPU 101 obtains the destination information inputted in the step S502, and determines whether the destination information is a telephone number format or a SIP URI format (step S504). In the step S504, the CPU 101 determines that the inputted destination information is the telephone number format when the destination information is constituted by numerals only. In the other case, the CPU 101 determines that the destination information is the SIP URI format.

When it is determined that the destination information is the SIP URI format, the process proceeds to step S505 in order to connect with a remote machine directly. On the other hand, when it is determined that the destination information is the telephone number format, the process proceeds to step S512 in order to connect with the remote machine via the SIP server.

In the step S505, the CPU 101 determines whether the IP address is included in the SIP URI. In the step S505, when the destination information consists of dots (.) and numerals only, it is determined that the destination information includes an IP address. In the other case, it is determined that the destination information is a host name or a domain name. When it is determined that the IP address is included in the SIP URI, the process proceeds to step S506. Otherwise, the process proceeds to step S509.

In the step S506, the CPU 101 determines whether the SIP URI includes the IP address in the same network. When it is determined that the SIP URI includes the IP address in the same network, the process proceeds to step S507. On the other hand, when it is determined that the SIP URI does not include the IP address in the same network, the process proceeds to step S508.

The CPU 101 transmits a SIP message of "INVITE" to this IP address (a second connection method) in the step S507, and finishes this process.

The CPU 101 transmits "INVITE" to a default gateway in the step S508, and finishes this process.

On the other hand in the step S509, the CPU 101 inquires whether the domain name is being registered in the DNS server 202. When the domain name is being registered in the DNS server 202 and the IP address could be obtained (YES in step S510) as a result of the inquiry to the DNS server 202, the process proceeds to the step S506. On the other hand, when no IP address could be obtained from the DNS server 202 in the step S510 (NO in the step S510), the process proceeds to step S511.

In the step S506, the CPU 101 determines whether the IP address obtained from the DNS server 202 is the IP address in the same network. When it is determined that the obtained IP address is an IP address in the same network in the step S506 (YES in the step S506), the CPU 101 transmits "INVITE" to the IP address concerned (step S507), and finishes this process.

On the other hand, when it is determined that the obtained IP address is not an IP address in the same network (NO in the step S506), the CPU 101 transmits "INVITE" to a default gateway (step S508), and finishes this process.

In the step S511, the CPU 101 finishes this process with a destination error, without transmitting.

In the step S512, the CPU 101 refers to the setting about "Use of SIP server", and determines whether the setting concerned is valid or not. When it is determined that the setting is valid, the process proceeds to step S513. When it is determined that the setting about "Use of SIP server" is invalid, the process proceeds to step S515.

In the step S513, the CPU 101 generates a SIP URI, such as "sip:2222©192.168.1.11", by adding the IP address of the SIP server 201 to the rear part than "@".

In the next step S514, the CPU 101 inserts the SIP URI into the "To header" field of the SIP message, transmits "INVITE" to the SIP server 201 (the first connection method), and finishes this process.

In the step S515, the CPU 101 finishes this process with a destination error, without transmitting.

According to the above-mentioned embodiment, when an IP address is included in destination information that was inputted by a user, a message is transmitted to a remote machine specified by the IP address irrespective of the setting about "Use of SIP server". On the other hand, when a host name (domain) is included in the destination information, a message is transmitted to a remote machine specified by an IP address that is obtained by an address resolution with the DNS server. In this way, the transmitting process according to a user's demand can be performed certainly.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-103171, filed May 15, 2013, which is hereby incorporated by reference herein in its entirety.

What is claimed is:

1. A facsimile machine comprising:
a non-transitory memory device;
a processor;
a receiving unit configured to receive a destination from a user;
a determining unit configured to determine a type of the destination received by the receiving unit; and
a connecting unit configured to connect with the destination via a SIP server based on the determining unit determining that the type of the destination is a telephone number, and to connect with the destination not via a SIP server based on the determining unit determining that the type of the destination is a SIP URI,
wherein said receiving unit, said determining unit, and said connecting unit are implemented at least in part by the processor executing at least one program recorded on the non-transitory memory device.

2. The facsimile machine according to claim 1, further comprising an obtaining unit configured to obtain an IP address by inquiring of a DNS server, based on the determining unit determining that the type of the destination is the SIP URI and an IP address is not included in the SIP URI,
wherein said obtaining unit is implemented at least in part by the processor executing at least one program recorded on the non-transitory memory device.

3. The facsimile machine according to claim 1, further comprising
a setting unit configured to perform setting whether to connect with the destination via a SIP server or to connect with the destination not via a SIP server,
wherein said connecting unit connects with the destination not via a SIP server regardless of the setting performed by the setting unit based on the determining unit determining that the type of the destination is the SIP URI.

4. The facsimile machine according to claim 1, further comprising
a generation unit configured to generate, in a case where the type of the destination is a telephone number, a SIP URI by adding an IP address of the SIP server to the telephone number; and
a transmission unit configured to transmit the SIP URI generated by the generation unit to the SIP server,
wherein said generation unit and said transmission unit are implemented at least in part by the processor executing at least one program recorded on the non-transitory memory device.

5. The facsimile machine according to claim 1, wherein the determining unit determines that the type of the destination is the telephone number in a case where the destination consists of numerals only.

6. A control method for a facsimile machine comprising:
receiving a destination from a user;
determining a type of the destination received from the user; and
connecting with the destination via a SIP server based on it being determined that the type of the destination is a telephone number, and connecting with the destination not via a SIP server based on it being determined that the type of the destination is a SIP URI.

7. The control method for the facsimile machine according to claim 6, further comprising obtaining an IP address by inquiring of a DNS server, based on it being determined that the type of the destination is the SIP URI and an IP address is not included in the SIP URI.

8. The control method for the facsimile machine according to claim 6, further comprising
performing setting whether to connect with the destination via a SIP server or to connect with the destination not via a SIP server,
wherein connection with the destination not via a SIP server is performed regardless of the performed setting based on it being determined that the type of the destination is the SIP URI.

9. The control method for the facsimile machine according to claim 8, further comprising generating a SIP URI by adding the IP address of the SIP server to the telephone number that was inputted as the destination information.

10. The control method for the facsimile machine according to claim 6, wherein it is determined that the type of the destination is the telephone number in a case where the destination consists of numerals only.

11. The facsimile machine according to claim 1, further comprising
a managing unit configured to manage a term of validity of a telephone number of the facsimile machine registered in the SIP server; and
a registering unit configured to transmit the telephone number of the facsimile machine again before expiring the term of validity managed by said managing unit,
wherein said managing unit and said registering unit are implemented at least in part by the processor executing at least one program recorded on the non-transitory memory device.

12. A facsimile machine comprising:
a non-transitory memory device;
a processor;
a receiving unit configured to receive a destination from a user;
a determining unit configured to determine, based on the type of the destination received by the receiving unit being a telephone number, a connection method for connecting with the destination via a SIP server and to determine, based on the type of the destination received by the receiving unit being a SIP URI, a connection method for connecting with the destination not via a SIP server; and
a connecting unit configured to connect with the destination in accordance with the connection method determined by the determining unit, wherein said receiving unit, said determining unit, and said connecting unit are implemented at least in part by the processor executing at least one program recorded on the non-transitory memory device.

13. A facsimile machine comprising:
a non-transitory memory device;
a processor;
a receiving unit configured to receive a destination from a user;
a determining unit configured to determine, based on the type of the destination received by the receiving unit being a telephone number, a SIP server as a transmission destination of an INVITE message, and to determine, based on the type of the destination received by the receiving unit being a SIP URI, the destination received by the receiving unit as the transmission destination of the INVITE message; and
a transmission unit configured to transmit the INVITE message to the transmission destination of the INVITE message determined by the determining unit,
wherein said receiving unit, said determining unit, and said transmission unit are implemented at least in part by the processor executing at least one program recorded on the non-transitory memory device.

* * * * *